Sept. 1, 1931.  L. F. PIERCE  1,821,915

OSCILLATING ARC

Filed April 1, 1926

INVENTOR
Leo F. Pierce
BY White Tirst
his ATTORNEYS

Patented Sept. 1, 1931

1,821,915

UNITED STATES PATENT OFFICE

LEO F. PIERCE, OF SAN DIEGO, CALIFORNIA, ASSIGNOR TO FEDERAL TELEGRAPH COMPANY, OF SAN FRANCISCO, CALIFORNIA, A CORPORATION OF CALIFORNIA

OSCILLATING ARC

Application filed April 1, 1926. Serial No. 99,179.

This invention relates to arc generators for the production of high frequency electric waves and has as an object to increase the reliability and efficiency of such devices. In order to secure proper functioning of arc generators it is customary to operate the arc in a gaseous medium such as hydrogen or gaseous hydrocarbons, the gaseous hydrocarbons being usually generated by the vaporization of liquid hydrocarbons such as, for instance, gasoline, kerosene, or alcohol.

One common method of using a liquid capable of producing gaseous hydrocarbon has been to enclose the arc in a chamber and drip the liquid into contact with one of the heated electrodes, thus utilizing the heat of the electrode to vaporize the same. This method is not satisfactory as it results in uneven heating of the electrode with consequent instability of the arc. The disadvantages of this method are very marked when an arc utilizing metal electrodes is employed. It has been found however that an arc will operate successfully in a gaseous medium containing carbon in a certain peculiar condition, which may be produced by subjecting certain liquids capable of producing gaseous hydrocarbon such as alcohol or a liquid hydrocarbon, to a cracking process whereby the complex compounds undergo a molecular dissociation.

In accordance with this invention, means is provided for continuously producing, and supplying to an arc, a suitable gaseous hydrocarbon by heating a liquid hydrocarbon in the presence of a catalytic agent and conducting the resultant gas directly to the arc chamber.

Referring to the drawings.

Figure 1:
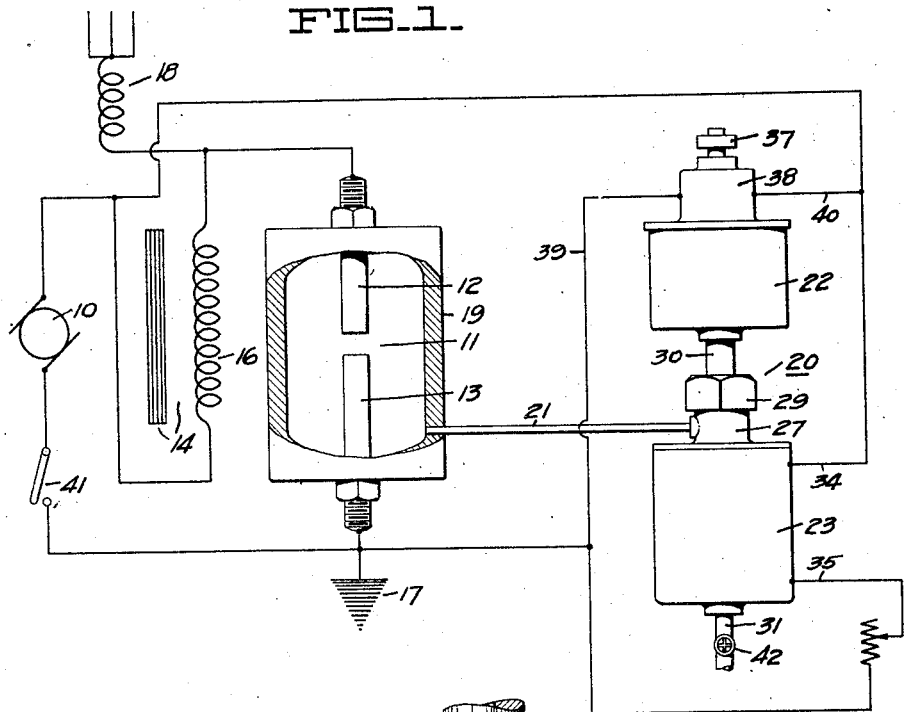
Figure 1 is a circuit diagram showing the incorporation of this invention with a representative form of oscillating arc system.
Figure 2:
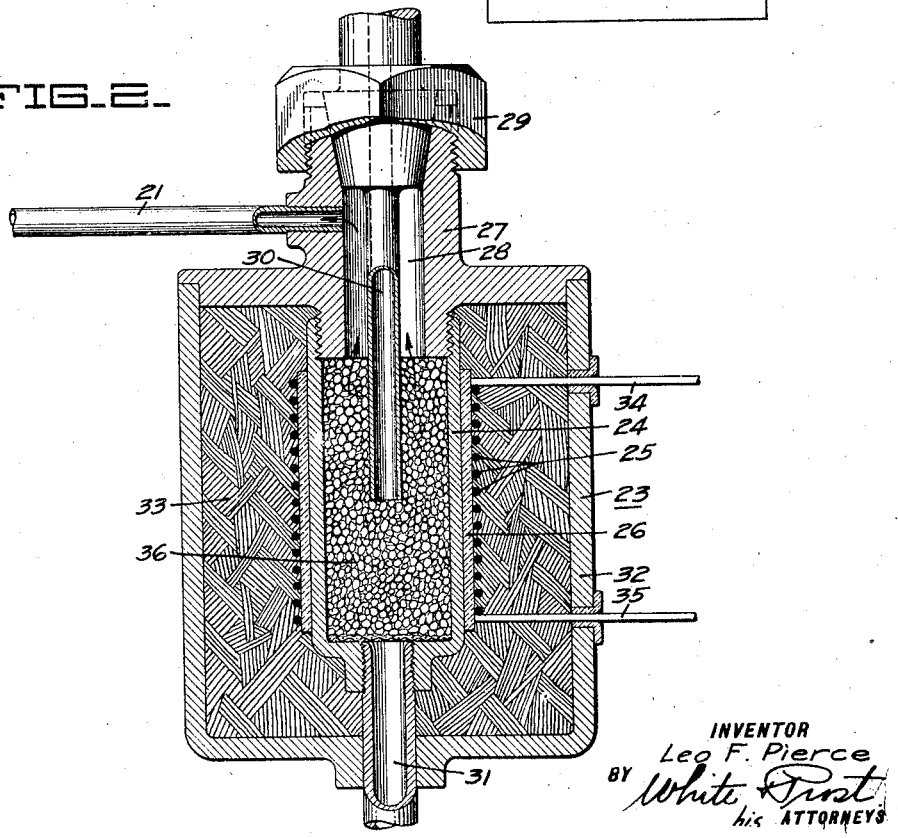
Fig. 2 is a detail cross sectional view of the generating apparatus.

The system shown in Fig. 1 comprises generally a generator or other suitable source of energy 10 which supplies the oscillating arc 11. The particular form of oscillating arc illustrated comprises a pair of metallic electrodes 12 and 13 which are disposed longitudinally in the magnetic field produced by a magnet 14, the winding 16 of which is connected in series with the generator 10, whereby it serves both as a choke for radio frequency current and also as a means for controlling the current supplied to the arc. In such an arrangement the arc girates about the axis of the electrodes. A suitable absorption circuit such as a ground 17 and antenna circuit 18 may be coupled to the arc electrodes. The electrodes are inclosed in a suitable chamber 19 whereby they may be subjected to any desired gaseous atmosphere. A generator 20 is connected to the chamber 19 by means of pipe 21 for supplying a gaseous medium to the interior of the arc chamber.

The generator 20 includes a reservoir 22 for storing a suitable liquid, which reservoir is in communication with a retort 23 for converting the liquid to a gaseous medium.

The retort 23 is provided with a container 24 which is adapted to be heated by any suitable means such as an electrical resistance 25. In the construction shown, the resistance 25 is in the form of a coil wound around the refractory tube 26, the tube 26 being disposed about the periphery of the container 24. The upper portion of the container 24 may be supported by any suitable mounting 27 provided with an internal passageway 28. The tube 21 which serves to conduct gas to the arc chamber 19 is in communication with this passageway 28. The upper portion of the mounting 27 is provided with a suitable fitting 29 whereby communication is established between the reservoir 22 and the interior of the retort. The tube 30 which extends down into the interior of the container 24 serves to conduct the liquid from the reservoir 22 into the interior of the container 24. A drain pipe 31 may be provided for the lower portion of the container 24 to drain away any unvaporized liquid. It is also preferable to provide an outer casing 32 to inclose the parts to be heated and to fill in the space between the casing 32 and the container 24 with heat insulating material 33. Conductors 34 and 35 connected to a source of current such as the generator 10, project through the casing 32 for energizing the heating resistance coil 25.

The interior of the container 24 is preferably filled with a porous mass of refractory material through which the vaporized liquid may readily flow. This refractory mass is provided with a finely distributed catalytic agent which will aid in bringing about the desired degree of molecular dissociation of the vaporized liquid. A variety of catalytic agents may be employed although it is preferable to employ a metallic substance such as a metal, metallic oxide, or mixture of both. Good results have been obtained by employing nickel oxide or a mixture of nickel and nickel oxide, although aluminum, aluminum oxide or mixture of both may be used.

One way of preparing the refractory mass is to take a number of small pieces of the refractory material such as pumice stone, about the size of a pea, and impregnate the same in a solution of a metallic salt such as nickel nitrate. After being thoroughly impregnated the mass is subjected to burning to reduce the nickel nitrate to nickel oxide. By this method the metallic oxide may be readily distributed in finely divided form through the refractory mass so that it affords a maximum area of contact with the hydrocarbon.

In operating the device the resistance coil 25 is energized from a suitable source of current such as the generator 10 as shown in Fig. 1, and the container 24 and contents heated to a relatively high temperature, say from 500 to 600 degrees Fahrenheit. An organic liquid such as alcohol, or other liquid hydrocarbon is then fed down through the tube 30 from the reservoir 22 and thereby introduced into the mass of refractory material 36. On coming into contact with the refractory material the liquid will be almost instantly vaporized and by virtue of the relatively high temperature and the presence of the catalytic agent a dissociation or molecular rearrangement of its constituents will take place. The resulting gaseous product is caused to flow upwardly through the refractory mass into the passageway 28 and out through the tube 21 into the arc chamber 19. In passing upward through the refractory mass the cracking or dissociation process is completed to a degree which will produce optimum results in the operation of the arc. Since the liquid as it is introduced into the refractory mass passes downwardly through the same and as the vapors or gases subsequently pass upwardly in an opposite direction, this upward flow of gaseous products may be termed a counter-flow effect. In use the oxide is gradually reduced to the metal, although the exact manner in which its oxygen content combines with the gaseous products is not known. The breakdown or dissociation of the gases is so complete that free carbon is liberated which is deposited on the catalyzer so that after the generator has been in operation for some time the metallic substance loses its effectiveness. Instead of inserting a new charge the catalyzer may be reactivated by heating the refractory mass in the presence of oxygen or air. This may readily be accomplished by merely removing the mounting 27 from the upper portion of the container 24 to allow the contents thereof to be exposed to the air.

The generator is preferably associated with the arc system in such a manner that liquid will not be fed to the retort unless the arc is being energized. Thus as shown diagrammatically in Fig. 1, the feeding of liquid from the reservoir 22 into the retort 23 is controlled by means of a valve 37 which is actuated by means of an electromagnet or other electrical control means 38 connected across the generator circuit by means of the conductors 39 and 40. The switch means 41 in series with the generator 10 serves to control both the current supplied to the arc electrodes and to the electromagnet 38. The drain pipe 31 is also preferably provided with a valve 42 so that any liquid which may collect in the bottom of the container 24 may be drained therefrom.

I claim:

In an oscillating arc system comprising a pair of electrodes in a chamber, a reservoir of suitable hydrocarbon liquid, means for vaporizing liquid from said reservoir and conducting the resultant gas to said chamber, and a valve for supplying liquid from said reservoir to said vaporizing means controlled by the operating potential applied to said arc, whereby liquid is supplied only during operation of the arc.

In testimony whereof, I have hereunto set my hand.

LEO F. PIERCE.